United States Patent
Yamaji et al.

(10) Patent No.: US 9,871,389 B2
(45) Date of Patent: Jan. 16, 2018

(54) BATTERY PACK

(71) Applicant: MAKITA CORPORATION, Anjo-shi, Aichi (JP)

(72) Inventors: Shunpei Yamaji, Anjo (JP); Takayoshi Endo, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 149 days.

(21) Appl. No.: 14/944,471

(22) Filed: Nov. 18, 2015

(65) Prior Publication Data

US 2016/0156206 A1  Jun. 2, 2016

(30) Foreign Application Priority Data

Nov. 28, 2014 (JP) ................. 2014-241413

(51) Int. Cl.
*H02J 7/00* (2006.01)
*H02H 7/18* (2006.01)
*H02H 3/04* (2006.01)

(52) U.S. Cl.
CPC ........... *H02J 7/0026* (2013.01); *H02H 3/044* (2013.01); *H02H 7/18* (2013.01); *H02J 7/0031* (2013.01); *H02J 7/0021* (2013.01); *H02J 2007/0039* (2013.01)

(58) Field of Classification Search
USPC ....... 320/135, 124, 134, 136, 137, 112, 118, 320/162
See application file for complete search history.

(56) References Cited

U.S. PATENT DOCUMENTS

| | | | | |
|---|---|---|---|---|
| 6,194,873 B1* | 2/2001 | Matsushita | ............. | G05F 1/575 320/137 |
| 6,331,763 B1* | 12/2001 | Thomas | ................. | H02H 9/042 320/136 |
| 6,340,880 B1* | 1/2002 | Higashijima | ......... | H02J 7/0031 320/134 |
| 8,183,835 B2* | 5/2012 | Takeda | .................... | H01M 2/34 320/112 |

(Continued)

FOREIGN PATENT DOCUMENTS

JP  4831171 B2  12/2011

OTHER PUBLICATIONS

Mar. 10, 2016 extended Search Report issued in European Patent Application No. 15196590.2.

*Primary Examiner* — Brian Ngo
(74) *Attorney, Agent, or Firm* — Oliff PLC (57) ABSTRACT

A battery pack in the present disclosure comprises: a battery; a switching element that is provided in a discharge path from the battery to an external load and that is configured to complete or interrupt the discharge path; a control circuit that operates by receiving a supply of an electric power from the battery, that conducts an electric current through the switching element so as to allow discharge from the battery to the external load, and upon occurrence of an abnormality in the battery or the external load during the discharge, that interrupts the switching element so as to inhibit the discharge from the battery to the external load; and a protection circuit that monitors an operating condition of the control circuit and that interrupts the switching element when the control circuit is inoperative.

11 Claims, 7 Drawing Sheets

(56) References Cited

U.S. PATENT DOCUMENTS

| | | | | |
|---|---|---|---|---|
| 8,648,572 B2* | 2/2014 | Kiyohara | ............... | H01M 10/44 |
| | | | | 320/134 |
| 2010/0176764 A1 | 7/2010 | Tachikawa et al. | | |
| 2011/0305926 A1 | 12/2011 | Kim et al. | | |
| 2012/0032646 A1* | 2/2012 | Lee | ....................... | H02J 7/0031 |
| | | | | 320/135 |
| 2016/0006287 A1* | 1/2016 | Zhong | ................... | H02J 7/0068 |
| | | | | 320/107 |
| 2016/0087314 A1* | 3/2016 | Arashima | ........... | H01M 10/425 |
| | | | | 320/134 |

* cited by examiner

BATTERY PACK

CROSS-REFERENCE TO RELATED APPLICATIONS

This application claims the benefit of Japanese Patent Application No. 2014-241413 filed Nov. 28, 2014 in the Japan Patent Office, the entire disclosure of which is incorporated herein by reference.

BACKGROUND

The present disclosure relates to a battery pack comprising a control circuit that controls discharge from a battery to an external load.

For example, a battery pack described in Japanese Patent No. 4831171 comprises a switching element (for example, FET, etc.) and a control circuit. The switching element is provided in a discharge path from a battery to an external load. The control circuit causes the switching element to conduct an electric current, thereby allowing discharge from the battery to the external load.

The control circuit interrupts the switching element to protect the battery against over-discharge, etc. when an abnormality occurs during the discharge (for example, during discharge from the battery to the external load, a state where a discharge current has a value equal to or greater than a threshold value, i.e., an over-current state, continues for a specified period of time or longer).

SUMMARY

In the battery pack, the control circuit operates by receiving a supply of electric power from the battery. In such a control circuit, if a discharge current from the battery becomes excessively larger because of a short circuit in the external load, etc., resulting in a rapid drop of the battery voltage, the control circuit may stop operating.

In this case, the control circuit cannot interrupt the switching element before the control circuit stops operating. Consequently, an electric current continues to flow to the switching element even after the operation of the control circuit has stopped.

This is because, a capacitor for stabilizing an input voltage is generally provided in a control terminal of the switching element (specifically, in a gate of the switching element if the switching element is a FET, or in a base of the switching element if the switching element is a bipolar transistor).

That is to say, even when the control circuit stopped operating and a drive voltage is no longer inputted from the control circuit to the control terminal of the switching element, the switching element remains in an ON state until electric charges that have stored in the capacitor coupled to the control terminal are completely discharged; as a result, an electric current continues to flow to the switching element.

In this case, a voltage at the control terminal of the switching element is reduced gradually by the discharge from the capacitor. This increases an on-state resistance of the switching element; consequently, electric power consumption in the switching element increases, which may result in a failure of the switching element.

In view of the above, in a battery pack comprising a control circuit that controls discharge from the battery, it is preferable to configure such that if the control circuit stops operating because of a rapid decrease of a battery voltage, a switching element provided in a discharge path is promptly interrupted, thereby inhibiting a failure of the switching element.

A battery pack of the present disclosure comprises a battery, a switching element, a control circuit, and a protection circuit. The switching element is provided in a discharge path from the battery to an external load and is configured to complete or interrupt the discharge path.

The control circuit operates by receiving a supply of an electric power from the battery and conducts an electric current through the switching element so as to allow discharge from the battery to the external load. Also, upon occurrence of an abnormality in the battery or the external load during the discharge from the battery to the external load, the control circuit interrupts the switching element so as to inhibit the discharge from the battery to the external load.

The protection circuit monitors an operating condition of the control circuit; the protection circuit interrupts the switching element when the control circuit is inoperative.

As above, according to the battery pack of the present disclosure, if the battery voltage decreases rapidly and the control circuit becomes inoperative, the protection circuit detects such an inoperative state and interrupts the switching element.

Therefore, in the case that the battery voltage rapidly decreases while the switching element is in a conducting state, an electric current is inhibited from continuously flowing to the switching element. In other words, a failure of the switching element caused by a continuous flow of an electric current to the switching element can be inhibited.

To enable operation of the protection circuit, a power source for driving the protection circuit is necessary. The protection circuit needs to be operated even when the battery voltage decreases. For this purpose, a charge storage unit that is configured to be charged from one of the battery and the control circuit may be used as a power source for driving the protection circuit.

To the charge storage unit, it is just sufficient to charge electric power that is necessary for the protection circuit to interrupt the switching element. Thus, a capacitor of small capacity can be used as the charge storage unit, thereby achieving cost and size reduction.

Moreover, a diode that inhibits a reverse flow may be provided in a charge path to the charge storage unit from one of the battery and the control circuit.

With this configuration, when one of a power supply voltage for the battery voltage and a power supply voltage for the control circuit decreases, electric power that had been charged in the charge storage unit is inhibited from discharging to one of the battery and the control circuit; consequently, operation of the protection circuit can be further ensured.

The protection circuit may be configured as a first protection circuit (so-called watchdog circuit) that monitors a pulse signal periodically outputted from the control circuit so as to determine whether the operation of the control circuit has stopped. Alternatively, the protection circuit may be configured as a second protection circuit that determines that the operation of the control circuit has stopped based on a change in an electric potential of an output port of the control circuit. Moreover, the protection circuit may be configured by combining the first protection circuit with the second protection circuit.

In a case where the protection circuit is configured as the first protection circuit (so-called watchdog circuit), the control circuit may be configured such that during normal operation of the control circuit, the control circuit outputs the pulse signal from a first output port at a specified periodic interval.

With this configuration, the first protection circuit may be configured such that when outputting of the pulse signal from the first output port of the control circuit stops, the first protection circuit determines that the control circuit is inoperative and interrupts the switching element.

In a case where the charge storage unit is provided as the power source for the first protection circuit, the charge storage unit may be configured to be charged from the battery via the diode.

The first protection circuit determines that the control circuit is inoperative when the output of the pulse signal from the first output port of the control circuit has stopped. Accordingly, there is a given time delay from the time the battery voltage rapidly decreases until the first protection circuit becomes able to interrupt the switching element.

For this reason, an amount of an electric power necessary to operate the first protection circuit during a period of the time delay needs to be charged in the charge storage unit. To achieve this, it is preferable that a high charge voltage is charged to the charge storage unit.

As above, in order to charge the charge storage unit serving as the power source for the first protection circuit, it is advantageous to use, not a power supply voltage for the control circuit, but a battery voltage higher that the power supply voltage. Moreover, with this configuration, a capacity of the charge storage unit can be reduced, thereby reducing cost and size of the charge storage unit.

On the other hand, in a case where the protection circuit is configured as the second protection circuit, the control circuit may be configured such that when a second output port has a specified electric potential (High or Low) during normal operation of the control circuit and the operation of the control circuit is stopped, the second output port is opened so as to be in a floating state.

In this case, the second protection circuit can interrupt the switching element when the control circuit becomes inoperative because of a decrease in the battery voltage and the second output port is in a floating state; thus, the second protection circuit can promptly interrupt the switching element.

In a case where the charge storage unit is provided as the power source for the second protection circuit, the charge storage unit may be configured to be charged from the control circuit via the diode.

With this configuration, the power source voltage for the control circuit can be made equal to the charge voltage charged to the charge storage unit during normal operation of the control circuit. Therefore, it can be inhibited that a voltage difference between the aforementioned power source voltage and charge voltage causes an electric current to flow in a direction from the second protection circuit to the second outlet port or in the reverse direction.

That is, in a case where the charge storage unit serving as the power source for the second protection circuit is to be charged with the battery voltage, the power supply voltage for the second protection circuit becomes greater than the power supply voltage for the control circuit; this voltage difference may cause an electric current to flow in the direction from the second protection circuit to the second outlet port or in the reverse direction (in the case of a negative power supply).

In this case, it is necessary to provide a voltage limiting element so as to limit a power supply voltage that is to be supplied from the charge storage unit to the second protection circuit, thereby inhibiting an electric current from flowing between the second protection circuit and the second outlet port. However, if it is configured such that the charge storage unit is charged from the control circuit, it becomes unnecessary to provide the voltage limiting element.

BRIEF DESCRIPTION OF THE DRAWINGS

Hereinafter, embodiments of the present disclosure will be described by way of example with reference to the accompanying drawings, in which.

DETAILED DESCRIPTION OF THE PREFERRED EMBODIMENTS

First Embodiment

Figure 1:
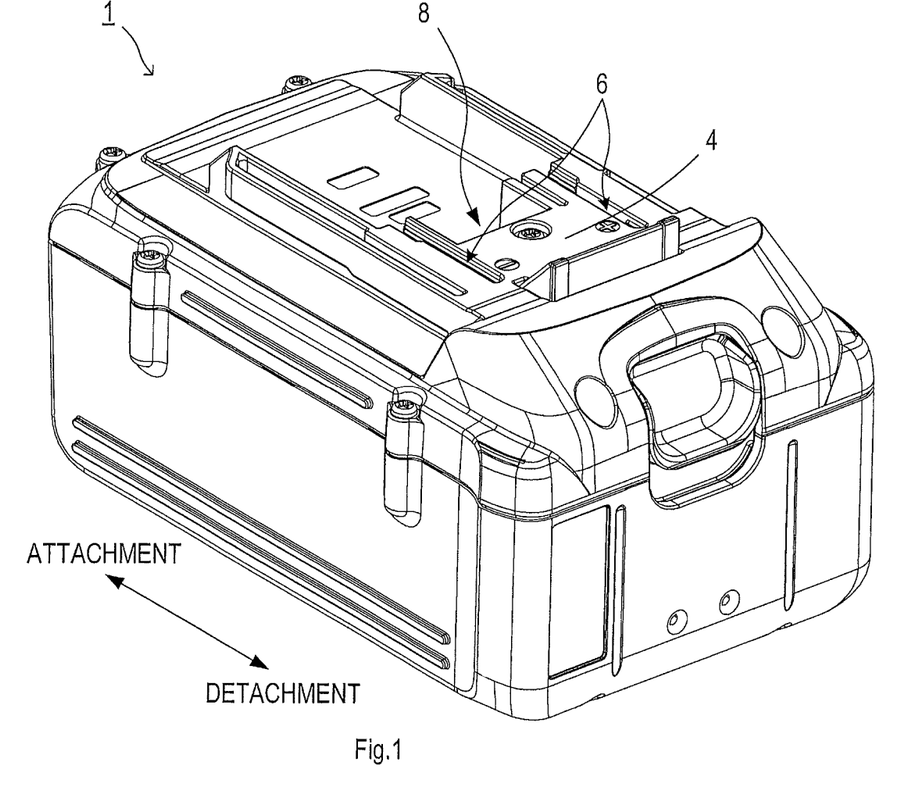
FIG. 1 is a perspective view showing an appearance of a battery pack according to an embodiment.

A battery pack 1 of the first embodiment is a unit that supplies electric power to an electric power tool. As shown in FIG. 1, on an outer wall of the battery pack 1, a connector 4 is provided for enabling detachable attachment to the electric power tool or a battery charger. The connector 4 comprises a power-supply terminal portion 6 and a connection terminal portion 8 so as to be electrically coupled to the electric power tool and the battery charger.

Figure 2:
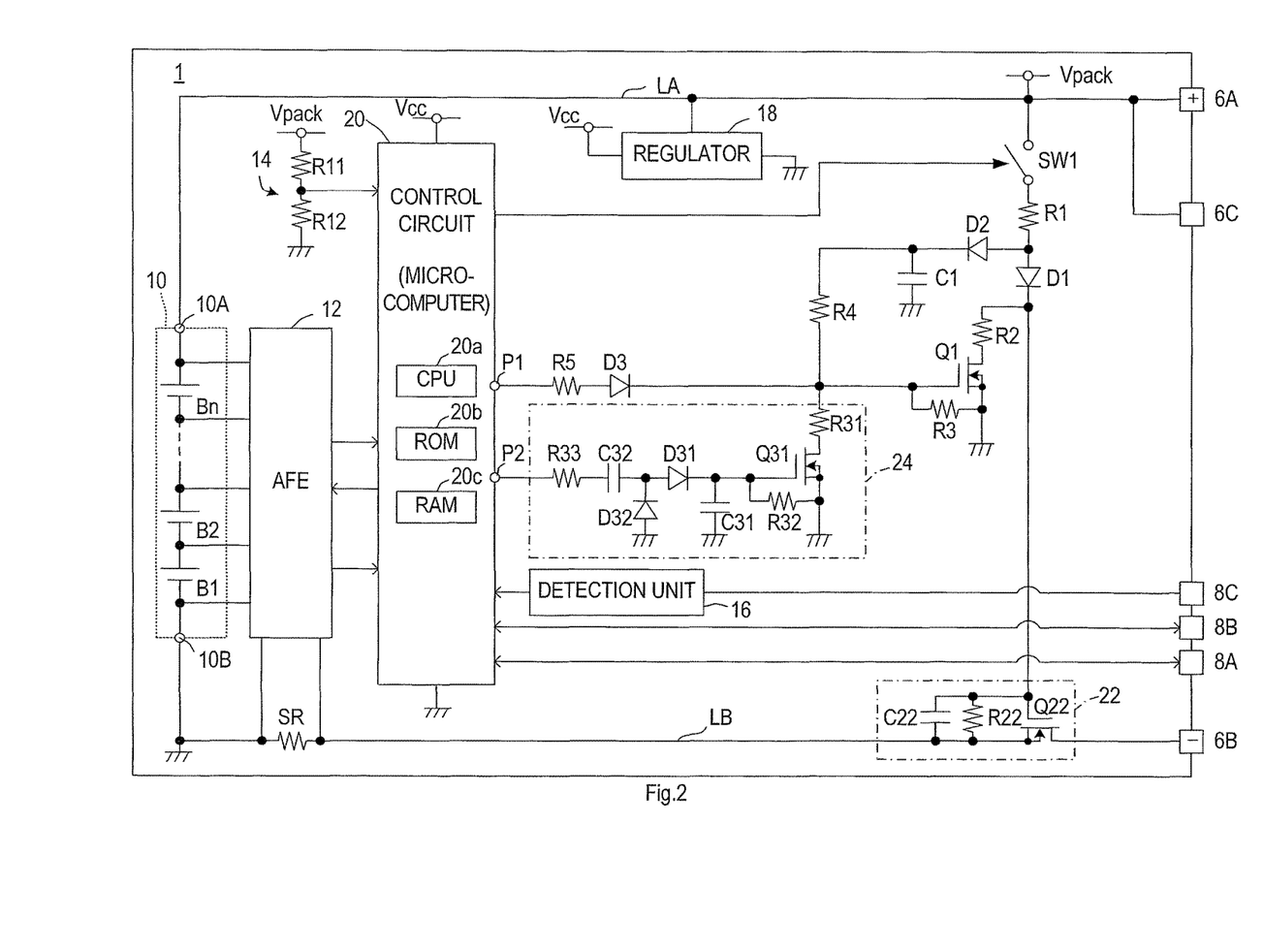
FIG. 2 is an electric circuit diagram showing a circuit configuration of a battery pack of a first embodiment.

As shown in FIG. 2, the battery pack 1 comprises a positive terminal 6A, a negative terminal 6B, and a charging terminal 6C, which are provided in the power-supply terminal portion 6, connection terminals 8A to 8C provided in the connection terminal portion 8, a battery 10 housed inside a case of the battery pack 1, and various circuits for charge/discharge control.

The positive terminal 6A and the negative terminal 6B are used to supply electric power to the electric power tool from the battery 10 when the battery pack 1 is attached to the electric power tool. The positive terminal 6A is to be coupled to a positive terminal of the electric power tool, and the negative terminal 6B is to be coupled to a negative terminal of the electric power tool.

The positive terminal 6A is coupled to a positive terminal 10A of the battery 10 via a positive power supply line LA; the negative terminal 6B is coupled to a negative terminal 10B of the battery 10 via a negative power supply line LB.

In the negative power supply line LB extending from the negative terminal 10B of the battery 10 to the negative terminal 6B of the battery pack 1, a resistor SR for current detection and an interruption switch 22 are provided, in order from the negative terminal-10B side of the negative power supply line LB. Moreover, the negative terminal 10B of the battery 10 is coupled to a ground line inside the battery pack 1.

The connection terminal 8A is a terminal used to communicatively couple a control circuit 20 provided in the battery pack 1 to a control circuit provided in the electric power tool when the battery pack 1 is attached to the electric power tool. Inside the battery pack 1, the connection terminal 8A is coupled to the control circuit 20 via a signal line.

The connection terminal 8B is a terminal used to communicatively couple the control circuit 20 to a control circuit provided in the battery charger when the battery pack 1 is attached to the battery charger. Inside the battery pack 1, the connection terminal 8B is coupled to the control circuit 20 via a signal line.

The connection terminal 8C is coupled to a power supply line provided in the battery charger and used to input a power supply voltage of the battery charger to a detection unit 16 inside the battery pack 1 when the battery pack 1 is attached to the battery charger.

The detection unit 16 detects, based on the voltage inputted from the connection terminal 8C, that the battery pack 1 has been coupled to the battery charger and outputs a detection signal to the control circuit 20.

The charging terminal 6C is coupled to the positive power supply line LA. When the battery pack 1 is attached to the battery charger, the charging terminal 6C is used to receive a charge voltage from the battery charger with the negative power supply line LB to supply a charge current to the battery 10.

The control circuit 20 is a circuit that controls charging and discharging of the battery 10; the control circuit 20 is provided with a microcomputer comprising a CPU 20a, a ROM 20b, and a RAM 20c.

When the battery pack 1 is attached to the electric power tool, the control circuit 20 enables bi-directional communication with the control circuit provided in the electric power tool via the connection terminal 8A.

Moreover, when the battery pack 1 is attached to the battery charger, the control circuit 20 detects this attachment via the detection unit 16 and enables bi-directional communication with the control circuit provided in the battery charger via the connection terminal 8B.

The battery 10 comprises a plurality of battery cells B1, B2, . . . Bn that are chargeable and dischargeable; the battery 10 generates a direct current voltage for driving the electric power tool. The plurality of battery cells B1, B2, . . . Bn are serially coupled to one another between the positive terminal 10A and the negative terminal 10B. The battery 10 may be, for example, a lithium-ion battery.

An Analog Front End (AFE) 12 that detects a state of the battery is coupled to the battery 10.

The AFE 12 is an analog circuit that is configured to detect, in accordance with a command from the control circuit 20, a total cell voltage of the battery cells B1, B2, . . . Bn forming the battery 10 so as to output the detection result to the control circuit 20.

The AFE 12 contains a current detection circuit (not shown); the current detection circuit detects a charge current to the battery 10 or a discharge current from the battery 10 via the resistor SR provided in the negative power supply line LB, and outputs the detection results to the control circuit 20.

The battery pack 1 comprises a voltage detection circuit 14 and a regulator 18. The voltage detection circuit 14 detects an output voltage Vpack (in other words, battery voltage) from the positive terminal 6A. The regulator 18 receives electric power supplied from the battery 10 to generate a power supply voltage (DC constant voltage) Vcc for the control circuit 20.

The voltage detection circuit 14 comprises two resistors R11 and R12 for dividing the output voltage Vpack; the voltage detection circuit 14 inputs, to the control circuit 20, the divided voltage as a detection result of the output voltage Vpack.

The battery pack 1 is configured such that electric power can be supplied to the regulator 18 also from the connection terminal 8C. This configuration is for enabling the following situation: in the case that the battery voltage decreases, when the battery pack 1 is attached to the battery charger, electric power is supplied to the regulator 18 from the battery charger so as to drive the control circuit 20.

The interruption switch 22 provided in the negative power supply line LB comprises a switching element Q22, a resistor R22, and a capacitor C22; the switching element Q22 comprises a FET; and the resistor R22 and the capacitor C22 are provided between a gate and a source of the switching element Q22.

The switching element Q22 may be, for example, an N-channel MOSFET. In this case, a drain of the N-channel MOSFET is coupled to the negative terminal 6B, and a source of the N-channel MOSFET is coupled to the negative terminal 10B of the battery 10 via the resistor SR.

The gate of the switching element Q22 is coupled to the positive power supply line LA via a control switch SW1, a resistor R1, and a diode D1.

One end of the control switch SW1 is directly coupled to the positive power supply line LA, whereas the other end of the control switch SW1 is coupled to the gate of the switching element Q22 via the resistor R1 and the diode D1.

An anode of the diode D1 is coupled to the resistor R1, and a cathode of the diode D1 is coupled to the gate of the switching element Q22.

The control switch SW1, together with the resistor R1 and the diode D1, forms a biasing circuit for driving the switching element Q22. The control switch SW1 is to be turned on and off by a control signal from the control circuit 20.

When the control switch SW1 is in an ON state, a drive voltage is applied to the gate of the switching element Q22, thereby making the switching element Q22 (and therefore, the interruption switch 22) be in an ON state; this enables charging and discharging of the battery 10. In this state, the capacitor C22 is charged.

When the control switch SW1 is changed from the ON state to an OFF state, the drive voltage is not supplied from the control switch SW1 to the switching element Q22; however, right after this change, the drive voltage is supplied from the capacitor C22 to the switching element Q22.

Thus, the switching element Q22 (and therefore, the interruption switch 22) remains to be in the ON state until, as a result of the discharge from the capacitor C22, a voltage between the gate and the source of the switching element Q22 becomes equal to or lower than a threshold value Vth. After a specified discharging period has elapsed, the switching element Q22 is changed to an OFF state to interrupt a charge path to the battery 10 and a discharge path from the battery 10.

The specified discharge period is to be set by using a time constant that is obtained by using a capacity of the capacitor C22 and a resistance value of the resistor R22. The reason why the discharge period is set in the aforementioned manner is to inhibit the following problem: in a case where the drive voltage for the switching element Q22 fluctuates because of noise, etc., the interruption switch 22 is changed to the OFF state, which may stop charging or discharging of the battery 10. In short, the capacitor C22 is used for stabilizing the drive voltage.

On one hand, if the battery pack 1 is coupled neither to the electric power tool nor to the battery charger, the control circuit 20 controls the control switch SW1 to be in the OFF state so as to turn off the interruption switch 22, thereby interrupting the charge and discharge paths of the battery 10.

On the other hand, if the battery pack 1 is coupled to the electric power tool, the control circuit 20 controls the control switch SW1 to be in the ON state so as to turn on the interruption switch 22, thereby allowing a current to flow through the discharge path of the battery 10; if the battery pack 1 is coupled to the battery charger, the control circuit 20 controls the control switch SW1 to be in the ON state so as to turn on the interruption switch 22, thereby allowing a current to flow through the charge path of the battery 10.

While controlling the control switch SW1 to be in the ON state, the control circuit 20 monitors detection signals from the AFE 12 or the voltage detection circuit 14, so as to detect abnormality in a voltage or an electric current during charging/discharging of the battery 10.

Upon detection of the abnormality, the control circuit 20 outputs, from an output port P1, an interruption signal (high level signal) for promptly turning off the interruption switch 22.

Specifically, in the first embodiment, a switching element Q1 is provided in an input path for the drive voltage, which extends from the diode D1 to the interruption switch 22 (specifically, to the gate of the switching element Q22); the switching element Q1 is provided to couple the input path to the ground line.

Upon detection of the abnormality in the battery voltage or the discharge current, etc. during charging/discharging of the battery 10, the control circuit 20 turns on the switching element Q1 to set a voltage level of the gate of the switching element Q22 at ground potential, thereby turning off the interruption switch 22.

The reason why the interruption switch 22 is turned off via the switching element Q1 upon detection of the abnormality in the above-described manner is to make the capacitor C22 of the interruption switch 22 discharge quickly, so that the charge and discharge paths of the battery 10 can be immediately interrupted.

The switching element Q1 may be a FET (for example, N-channel MOSFET). In this case, the switching element Q1 may be configured such that a drain of the switching element Q1 is coupled to the gate of the switching element Q22 via a resistor R2, a source of the switching element Q1 is coupled to the ground line, and a resistor R3 is provided between a gate and the source of the switching element Q1.

The interruption signal (high level signal) that is outputted from the output port P1 of the control circuit 20 is inputted to the gate of the switching element Q1 via a resistor R5 and a diode D3. By this interruption signal, the switching element Q1 is changed to an ON state.

The diode D3 is a reverse-flow inhibiting diode. An anode of the diode D3 is coupled to the output port P1 of the control circuit 20 via the resistor R5, and a cathode thereof is coupled to the gate of the switching element Q1.

In order to allow the capacitor C22 to discharge quickly, a resistance value of the resistor R2 is set to be smaller than the resistance value of the resistor R22 in the interruption switch 22.

The gate of the switching element Q1 is coupled to a protection circuit 24 and a capacitor C1. The protection circuit 24 is a circuit for monitoring an operation state of the control circuit 20 (so-called watchdog circuit). The capacitor C1 serves as a charge storage unit.

One end of the capacitor C1 is coupled to the positive power supply line LA, via a diode D2, the resistor R1, and the control switch SW1; also, this one end of the capacitor C1 is coupled to the gate of the switching element Q1 via a resistor R4. The other end of the capacitor C1 is coupled to the ground line.

An anode of the diode D2 is coupled to a connection point between the resistor R1 and the diode D1; a cathode of the diode D2 is coupled to the one end of the capacitor C1.

With the above-described configuration, when the control switch SW1 is in the ON state, the capacitor C1 is charged directly from the battery 10 via the resistor R1. The charged voltage is divided by the resistor R4 and the resistor R3 and then, the divided voltage is applied to the gate of the switching element Q1.

The control circuit 20 is configured such that while operating normally, the control circuit 20 periodically outputs a pulse signal (watch-dog pulse shown in FIG. 3) from an output port P2 at a specified time interval.

Upon receipt of the pulse signal, the protection circuit 24 couples the gate of the switching element Q1 to the ground line, thereby maintaining the switching element Q1 in an OFF state.

When the output of the pulse signal from the control circuit 20 is stopped, the protection circuit 24 detects that the control circuit 20 is not operating normally; then, the protection circuit 24 disconnects the current path between the gate of the switching element Q1 and the ground line.

As a result, the gate of the switching element Q1 is applied with a high voltage from the capacitor C1, which is higher than a threshold voltage Vth of the switching element Q1. Thereby, the switching element Q1 is changed to the ON state.

For this reason, when the output of the pulse signal from the output port P2 of the control circuit 20 is stopped (i.e., when the operation of the control circuit 20 is suspended or is abnormal), the interruption switch 22 is promptly interrupted by the operation of the protection circuit 24.

The protection circuit 24 comprises a switching element Q31. In the switching element Q31, a drain thereof is coupled to the gate of the switching element Q1 via the resistor R31, a source thereof is coupled to the ground line, and a resistor R32 is provided between a gate and the source of the switching element Q31. The switching element Q31 may be a FET (for example, N-channel MOSFET).

The protection circuit 24 comprises a capacitor C31. One end of the capacitor C31 is coupled to the gate of the switching element Q31, whereas the other end of the capacitor C31 is coupled to the ground line.

The capacitor C31 is charged via a resistor R33, a capacitor C32, and a diode D31 when a pulse signal (high level signal) is outputted from the output port P2 of the control circuit 20. On the other hand, when the output of the pulse signal is stopped, the capacitor C31 is discharged via the resistor R32.

Figure 3:
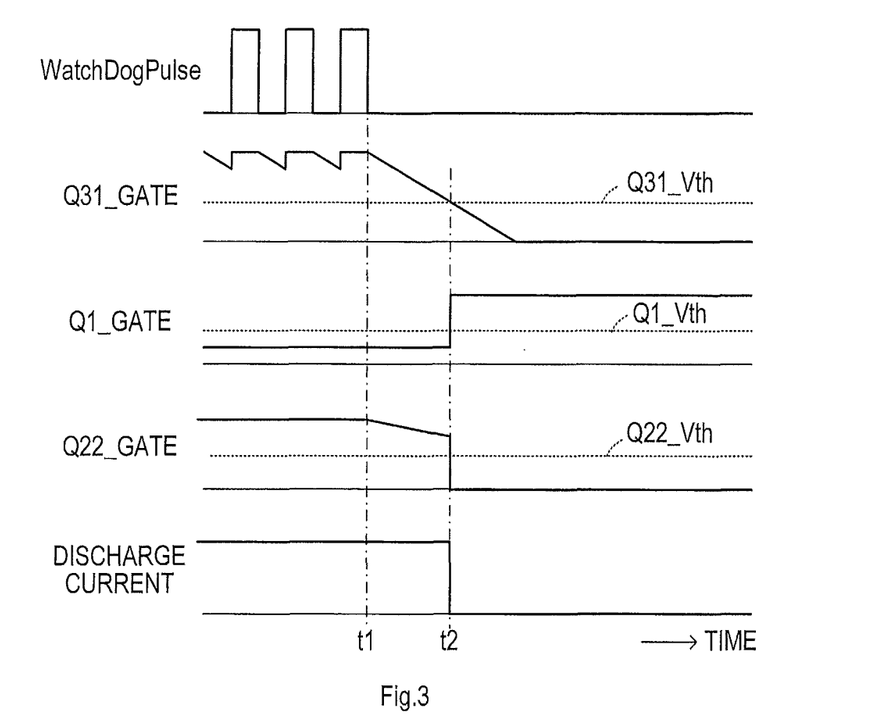
FIG. 3 is a timing diagram showing an operation of a protection circuit of the first embodiment.

In the protection circuit 24 of the first embodiment configured as above, as shown in FIG. 3, when the pulse signal (watch-dog pulse) is periodically outputted from the output port P2 of the control circuit 20, a gate voltage of the switching element Q31 is equal to or greater than the threshold voltage Vth.

Accordingly, during the normal operation of the control circuit 20, the switching element Q31 is in an ON state, thereby turning off the switching element Q1.

When the output of the pulse signal (watch-dog pulse) from the output port P2 of the control circuit 20 is stopped (i.e., time point t1), the capacitor C31 is discharged, causing gradual decrease of the gate voltage of the switching element Q31.

Then, when the gate voltage becomes lower than the threshold voltage Vth (i.e., time point t2), the switching element Q31 is changed to an OFF state, thereby turning on the switching element Q1.

As above, according to the first embodiment, at the time of discharging from the battery 10 to the electric power tool, when the control circuit 20 stops operating because of a rapid decrease of the battery voltage and an interruption signal is not outputted from the output port P1, the protection circuit 24 turns off the interruption switch 22 thereby to interrupt the discharge current.

For this reason, when the control circuit 20 stops operating, the switching element Q22 remains in the ON state until discharge from the capacitor C22 provided in the interruption switch 22 is completed; consequently, an electric current continues to flow to the switching element Q22, thereby inhibiting occurrence of a failure of the switching element Q22.

Here, in the first embodiment, the switching element Q22 forming the interruption switch 22 corresponds to an example of a switching element of the present disclosure; the output port P2 of the control circuit 20 corresponds to an example of a first output port of the present disclosure; and the protection circuit 24 corresponds to an example of a first protection circuit of the present disclosure. Moreover, the capacitor C1, which is to be charged from the battery 10 via the resistor R1 and the diode D2, corresponds to an example of a charge storage unit of the present disclosure.

Second Embodiment

A battery pack 2 in the second embodiment has a basic configuration that is the same as the basic configuration of the battery pack 1 in the first embodiment. Accordingly, in the following descriptions, the battery pack 2 will be described with respect to differences from the battery pack 1 in the first embodiment.

Figure 4:
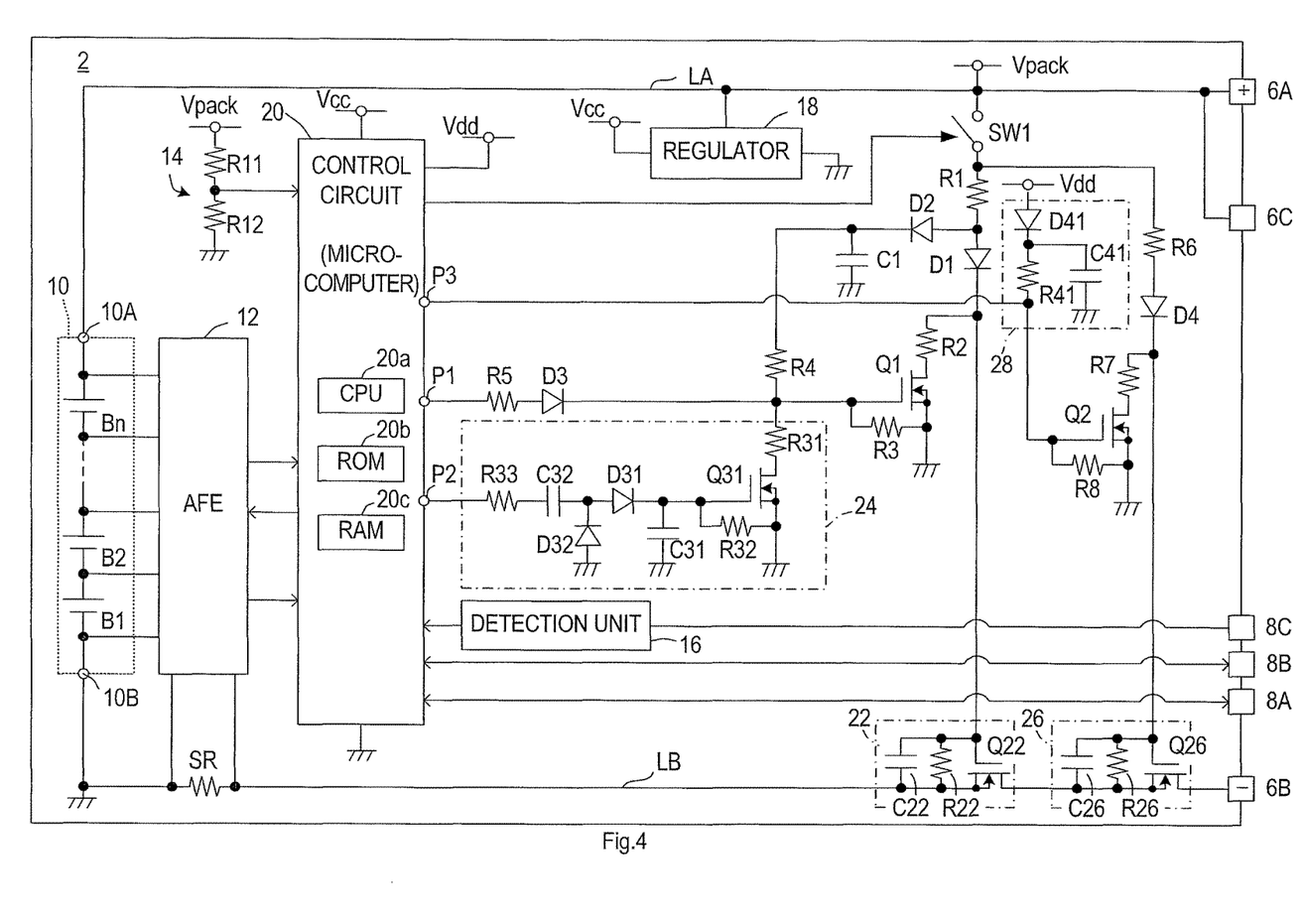
FIG. 4 is an electric circuit diagram showing a circuit configuration of a battery pack of a second embodiment.

As shown in FIG. 4, in the battery pack 2, the interruption switch 22 and an interruption switch 26 are coupled in series in the negative power supply line LB.

As in the case of the interruption switch 22, the interruption switch 26 comprises a switching element Q26, a resistor R26, and a capacitor C26. The switching element Q26 comprises a FET. The resistor R26 and the capacitor C26 are provided between a gate and a source of the switching element Q26.

A drain of the switching element Q26 is coupled to the negative terminal 6B, and a gate of the switching element Q26 is coupled to the positive power supply line LA, via a diode D4, a resistor R6 and the control switch SW1.

An anode of the diode D4 is coupled to the resistor R6, and a cathode of the diode D4 is coupled to the gate of the switching element Q26.

Accordingly, when the control switch SW1 is in the ON state, a drive voltage is applied to the gate of the switching element Q26, thereby making the switching element Q26 (and therefore, the interruption switch 26) be in an ON state. On the other hand, when the control switch SW1 is in the OFF state, the switching element Q26 (and therefore, the interruption switch 26) is changed to an OFF state.

Provided in an input path of the drive voltage, which extends from the diode D4 to the interruption switch 26 (specifically, to the gate of the switching element Q26), is a switching element Q2; the switching element Q2 is provided to couple the input path to the ground line via a resistor R7.

As in the case of the switching element Q1, the switching element Q2 comprises a FET (for example, N-channel MOSFET). A drain of the switching element Q2 is coupled to the gate of the switching element Q26 via the resistor R7, and a source of the switching element Q2 is coupled to the ground line. Moreover, a resistor R8 is provided between a gate and the source of the switching element Q2.

Coupled to the gate of the switching element Q2 is a charging circuit 28; the charging circuit 28 receives, via the diode D41, a power supply voltage Vdd outputted from the control circuit 20 to charge a capacitor C41 that serves as a charge storage unit.

In the charging circuit 28, a resistor R41 is provided. The resistor R41 is configured to divide a charge voltage of the capacitor C41 with the resistor R8 so as to apply the divided voltage to the gate of the switching element Q2, thereby turning on the switching element Q2.

A connection path that couples the resistor R41 to the gate of the switching element Q2 is coupled to an output port P3 of the control circuit 20.

Coupled to the output port P3 of the control circuit 20 is an output transistor (not shown); the output transistor is configured such that, when the control circuit 20 is operating by receiving a power supply from the regulator 18, the output transistor is in an ON state to couple the output port P3 to the ground line.

With this configuration, during the operation of the control circuit 20, the switching element Q2 is in an OFF state, whereas the interruption switch 26 is in an ON state by receiving a supply of the drive voltage via the control switch SW1.

When the control circuit 20 stops operating because of a rapid decrease of the battery voltage, the output port P3 is brought to be in a floating state.

When the control circuit 20 stops operating, the power supply voltage Vdd is not outputted from the control circuit 20; however, at the time when the operation of the control circuit 20 has stopped, the capacitor C41 provided in the charging circuit 28 is in an already-charged state because the capacitor C41 had been charged with the power supply voltage Vdd.

Figure 5:
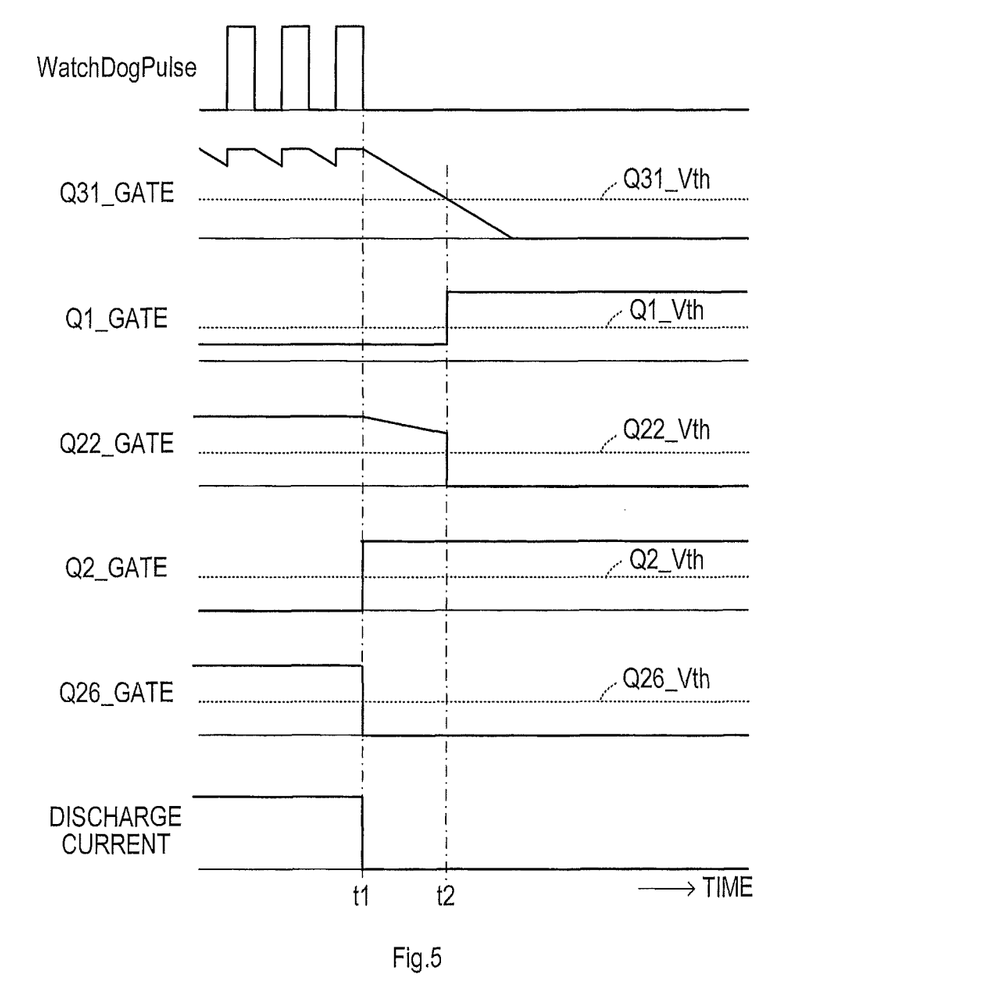
FIG. 5 is a timing diagram showing an operation of the protection circuit of the second embodiment.

Thus, as shown in FIG. 5, when the control circuit 20 stops operating (time point t1) during discharge from the battery 10 to the electric power tool, the gate of the switching element Q2 is applied with a high voltage from the capacitor C41, which is higher than the threshold voltage Vth. Consequently, the switching element Q2 is changed to an ON state.

When the switching element Q2 is in the ON state, a gate voltage of the switching element Q26 in the interruption switch 26 becomes lower than the threshold voltage Vth, thereby changing the switching element Q26 to the OFF state. As a result, the discharge current from the battery 10 to the electric power tool is interrupted.

Thus, according to the battery pack 2, in the case that the control circuit 20 stops operating because of a rapid decrease of the battery voltage, when an output from the output port P3 is changed in a normal manner to the floating state, the discharge path can be interrupted faster than in the case of the battery pack 1 of the first embodiment.

If the output port P3 cannot be changed to the floating state because of, for example, failures of the output transistor provided in the output port P3 of the control circuit 20, the protection circuit 24 interrupts the discharge path in the same manner as in the first embodiment.

For this reason, the battery pack 2 can inhibit failures of the switching elements Q22 and Q26 provided, respectively, in the interruption switches 22 and 26 by interrupting the discharge path in a more ensured manner at the time when the control circuit 20 stops operating because of a rapid decrease of the battery voltage.

In the second embodiment, the switching elements Q22 and Q26, which respectively form the interruption switches 22 and 26, correspond to an example of a switching element of the present disclosure; the output port P2 of the control circuit 20 corresponds to an example of a first output port of the present disclosure; and the protection circuit 24 corresponds to an example of a first protection circuit of the present disclosure.

Moreover, the output port P3 of the control circuit 20 corresponds to an example of a second output port of the present disclosure; the switching element Q2, the resistor R7, and the resistor R8 correspond to an example of a second protection circuit of the present disclosure; and the capacitor C41, which is to be charged in the charging circuit 28, corresponds to an example of a charge storage unit of the present disclosure.

Third Embodiment

A battery pack 3 in the third embodiment has a basic configuration that is the same as the basic configuration of the battery pack 1 in the first embodiment. Accordingly, in the following descriptions, the battery pack 3 in the third embodiment will be described with respect to differences from the battery pack 1 in the first embodiment.

Figure 6:
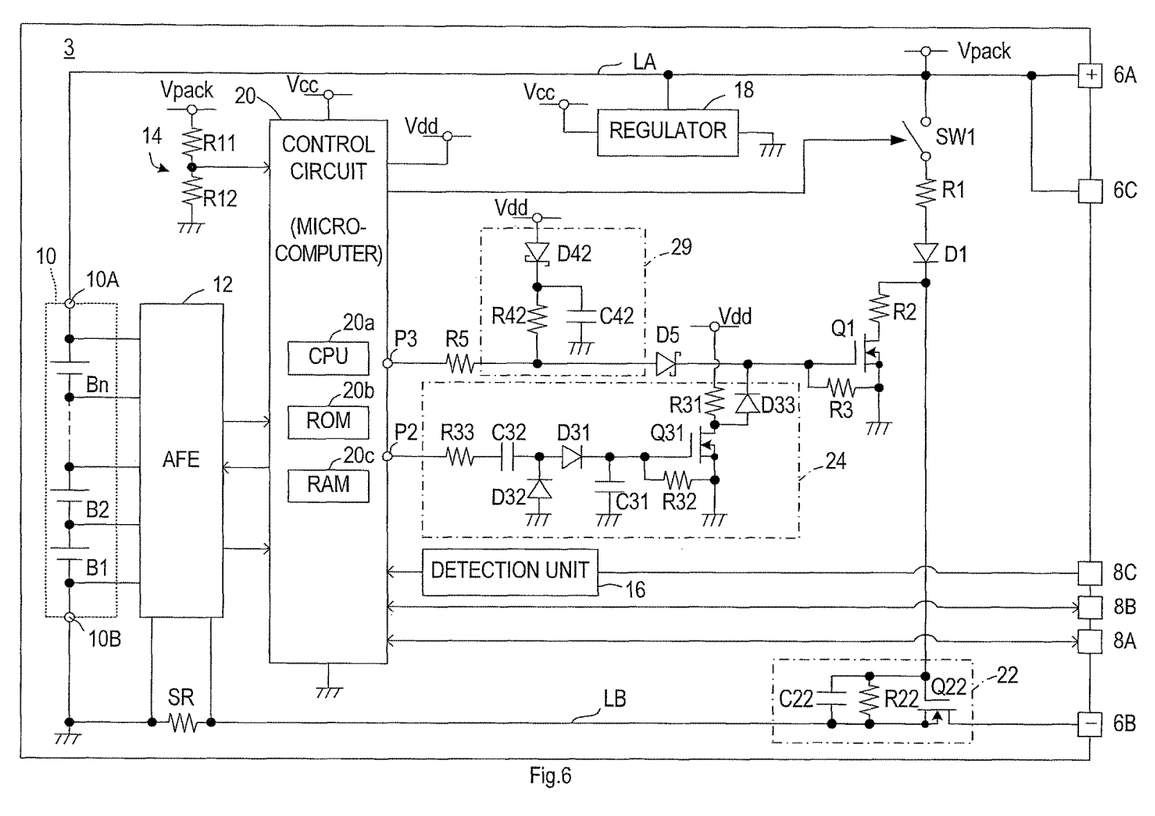
FIG. 6 is an electric circuit diagram showing a circuit configuration of a battery pack of a third embodiment.

As shown in FIG. 6, in the battery pack 3, the control circuit 20 comprises the output port P3 in the second embodiment, in place of the output port P1 in the first embodiment.

The output port P3 is coupled to the gate of the switching element Q1 via the resistor R5 and a diode D5. Coupled to a connection point between the resistor R5 and the diode D5 (specifically, an anode of the diode D5) is a charging circuit 29.

The charging circuit 29 is provided in place of the diode D2, the capacitor C1, and the resistor R4 in the first embodiment; the charging circuit 29 has the same configuration as that of the charging circuit 28 in the second embodiment.

Specifically, the charging circuit 29 is configured to receive, via a diode D42, a power supply voltage Vdd outputted from the control circuit 20 so as to charge a capacitor C42 that serves as a charge storage unit and to apply a charge voltage for the capacitor C42 to the connection point between the resistor R5 and the diode D5, via the resistor R42.

Each of the diodes D5 and D42 may be, for example, a Schottky diode. The Schottky diode has a low forward voltage drop and a fast switching speed, compared with other diodes (e.g., P-N junction diode).

The protection circuit 24 is coupled to the gate of the switching element Q1 (specifically, to a connection point between the gate of the switching element Q1 and a cathode of the diode D5). The protection circuit 24 comprises a diode D33 as a connecting element.

An anode of the diode D33 is coupled to the drain of the switching element Q31, and a cathode of the diode D33 is coupled to the gate of the switching element Q1. Moreover, the power supply voltage Vdd outputted from the control circuit 20 is applied to the drain of the switching element Q31 via the resistor R31.

As above, while the control circuit 20 is operating normally, the switching element Q31 in the protection circuit 24 is in the ON state; in this case, the protection circuit 24 does not output a high drive voltage to the gate of the switching element Q1.

On the other hand, if the control circuit 20 operates abnormally and the output of a pulse signal (watch-dog pulse) from the output port P2 is stopped, the capacitor C31 is discharged, which causes the switching element Q31 to be changed to the OFF state.

Then, the protection circuit 24 outputs the high drive voltage (voltage value: a forward voltage of Vdd-diode D33, i.e., so-called Vf) to the gate of the switching element Q1 via the diode D33; consequently, the switching element Q1 is changed to the ON state.

Accordingly, the protection circuit 24 operates as a general watchdog circuit and, for example, in a case where a microcomputer forming the control circuit 20 operates abnormally, the protection circuit 24 can turn off the interruption switch 22, thereby interrupting the discharge current.

On the other hand, when the control circuit 20 stops operating because of decrease of the battery voltage during discharge from the battery pack 3 to the electric power tool, the power supply voltage Vdd outputted from the control circuit 20 is also decreased. For this reason, the protection circuit 24 cannot turn on the switching element Q1.

Figure 7:
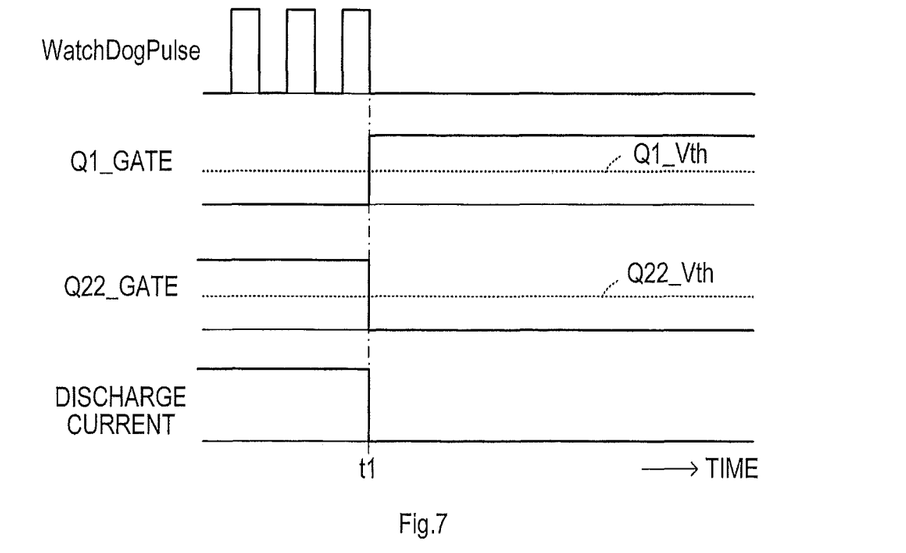
FIG. 7 is a timing diagram showing an operation of the protection circuit of the third embodiment.

In this regard, however, as shown in FIG. 7, when the control circuit 20 stops operating during the discharge to the electric power tool (time point t1), the output port P3 is in the floating state; thus, the gate of the switching element Q1 is applied with a high voltage from the capacitor C42, which is higher than the threshold voltage Vth. This high voltage is a voltage obtained by dividing the charge voltage for the capacitor C42 by the resistors R42 and R3.

Then, the switching element Q1 is changed to the ON state, a gate voltage of the switching element Q22 in the interruption switch 22 becomes lower than the threshold voltage Vth. This causes the switching element Q22 to be in the OFF state, thereby interrupting the discharge current from the battery 10 to the electric power tool.

As described above, in the same manner as in the battery pack 2 in the second embodiment, the battery pack 3 can interrupt the discharge path immediately at the time when the control circuit 20 stops operating because of a rapid decrease of the battery voltage and the output from the output port P3 is changed in a normal manner to the floating state.

In the third embodiment, the output port P3 of the control circuit 20 corresponds to an example of a second output port of the present disclosure; the charging circuit 29 and the diode D5 correspond to an example of a second protection circuit of the present disclosure; and the capacitor C42, which is charged in the charging circuit 29, corresponds to an example of a charge storage unit of the present disclosure.

The embodiments of the present disclosure have been described as above; however, the present disclosure is not limited to the above-described embodiments and can be carried out in various forms without departing from the main idea of the present disclosure.

For example, it has been described in the above-described embodiments that the switching elements provided in the battery packs 1 to 3, such as the switching elements Q22 and Q26 respectively forming the interruption switches 22 and 26, are a FET; however, these switching elements may be a bipolar transistor.

Moreover, it has been described in the above-described embodiments that the battery packs 1 to 3 are units that supply electric power to an electric power tool. However, any battery pack that includes a battery and supplies direct-current power source to an external load can be used.

What is claimed is:

1. A battery pack comprising:
   a battery;
   a switching element that is provided in a discharge path from the battery to an external load and that is configured to complete or interrupt the discharge path;
   a control circuit that operates by receiving a supply of an electric power from the battery, that conducts an electric current through the switching element so as to allow discharge from the battery to the external load, and upon occurrence of an abnormality in the battery or the external load during the discharge, that interrupts the switching element so as to inhibit the discharge from the battery to the external load;
   an interruption switching element provided in an input path of a drive voltage to the switching element and configured to couple the input path to a ground line;
   a capacitor provided in an input path of a drive voltage to the interruption switching element and configured to apply the drive voltage to the interruption switching element; and
   a protection circuit that monitors an operating condition of the control circuit and that disconnects a current path between the interruption switching element and the ground line when the control circuit is inoperative,
   the battery pack being configured such that, when the current path between the interruption switching element and the ground line is disconnected by the protection circuit, a voltage from the capacitor is applied to a drive terminal of the interruption switching element so as to turn on the interruption switching element, and the switching element is coupled to the ground line so as to be interrupted.

2. The battery pack according to claim 1, further comprising a charge storage unit as a power source for the protection circuit, the charge storage unit being configured to be charged from the battery.

3. The battery pack according to claim 1, further comprising a charge storage unit as a power source for the protection circuit, the charge storage unit being configured to be charged from the control circuit.

4. The battery pack according to claim 2,
   wherein a diode that inhibits a reverse flow is provided in a charge path from the battery to the charge storage unit.

5. The battery pack according to claim 3,
   wherein a diode that inhibits a reverse flow is provided in a charge path from the control circuit to the charge storage unit.

6. The battery pack according to claim 4,
   wherein during normal operation of the control circuit, the control circuit is configured to output a pulse signal from a first output port at a specified periodic interval, and
   wherein the battery pack comprises a first protection circuit as the protection circuit, the first protection circuit being configured such that when outputting of the pulse signal from the first output port stops, the first protection circuit determines that the control circuit is inoperative and interrupts the switching element.

7. The battery pack according to claim 5,
   wherein during normal operation of the control circuit, the control circuit is configured to output a pulse signal from a first output port at a specified periodic interval, and
   wherein the battery pack comprises a first protection circuit as the protection circuit, the first protection circuit being configured such that when outputting of the pulse signal from the first output port stops, the first protection circuit determines that the control circuit is inoperative and interrupts the switching element.

8. The battery pack according to claim 6,
   wherein the charge storage unit serving as a power source for the first protection circuit is configured to be charged from the battery via the diode.

9. The battery pack according to claim 1,
   wherein the control circuit comprises a second output port that has a specified electric potential during operation of the control circuit and that is in a floating state when the operation of the control circuit is stopped, and
   wherein the battery pack comprises a second protection circuit as the protection circuit, the second protection circuit being configured such that when the second output port of the control circuit is in the floating state, the second protection circuit determines that the control circuit is inoperative and interrupts the switching element.

10. The battery pack according to claim 3,
    wherein the control circuit comprises a second output port that has a specified electric potential during operation of the control circuit and that is in a floating state when the operation of the control circuit is stopped, and
    wherein the battery pack comprises a second protection circuit as the protection circuit, the second protection circuit being configured such that when the second output port of the control circuit is in the floating state, the second protection circuit determines that the control circuit is inoperative and interrupts the switching element.

11. The battery pack according to claim 10,
    wherein the charge storage unit serving as a power source for the second protection circuit is configured to be charged from the control circuit via the diode.

* * * * *